Nov. 21, 1967     A. E. KOOT     3,353,863
VEHICLE BODY PANEL CONSTRUCTION
Filed Sept. 29, 1965                        2 Sheets-Sheet 1
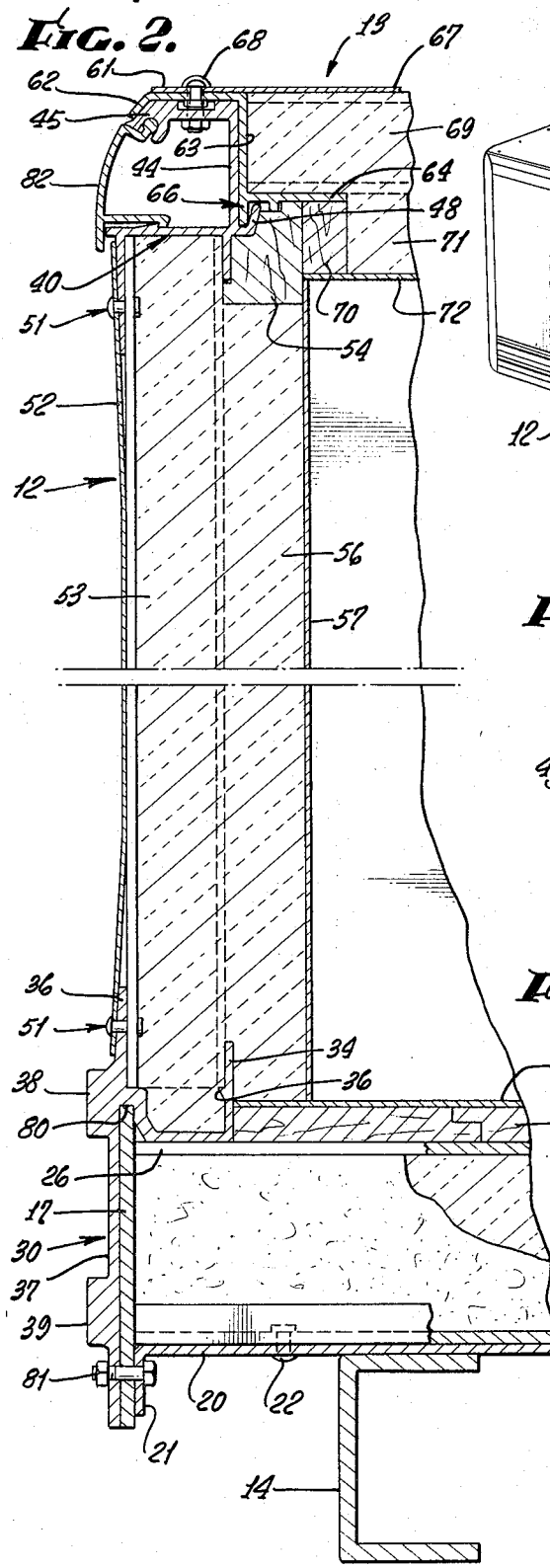
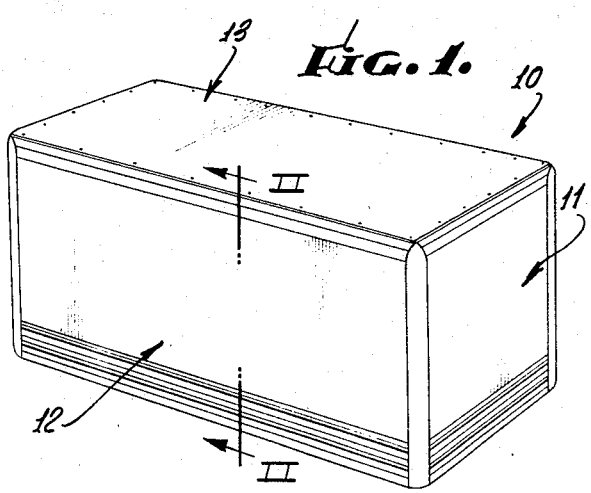
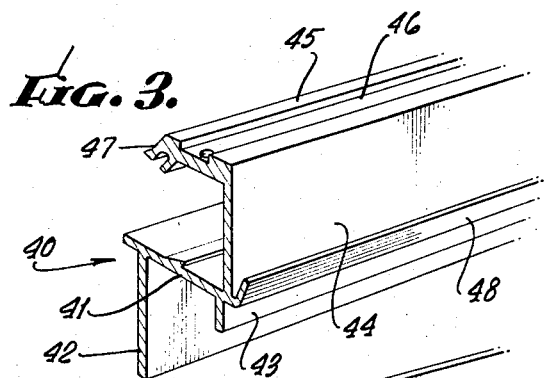
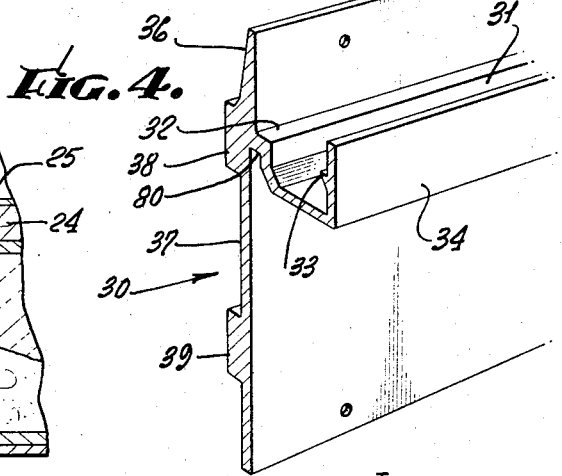
INVENTOR.
ALPHONSUS E. KOOT
BY Miketta, Glenny, Poms & Smith
ATTORNEYS.

Nov. 21, 1967            A. E. KOOT            3,353,863
VEHICLE BODY PANEL CONSTRUCTION
Filed Sept. 29, 1965            2 Sheets-Sheet 2
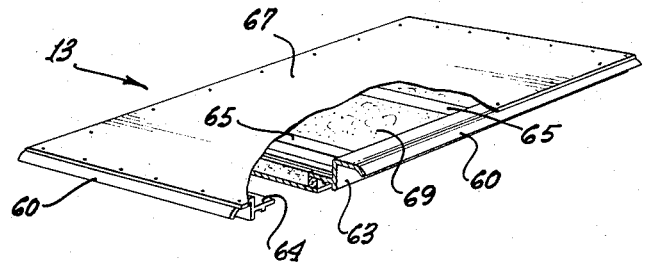
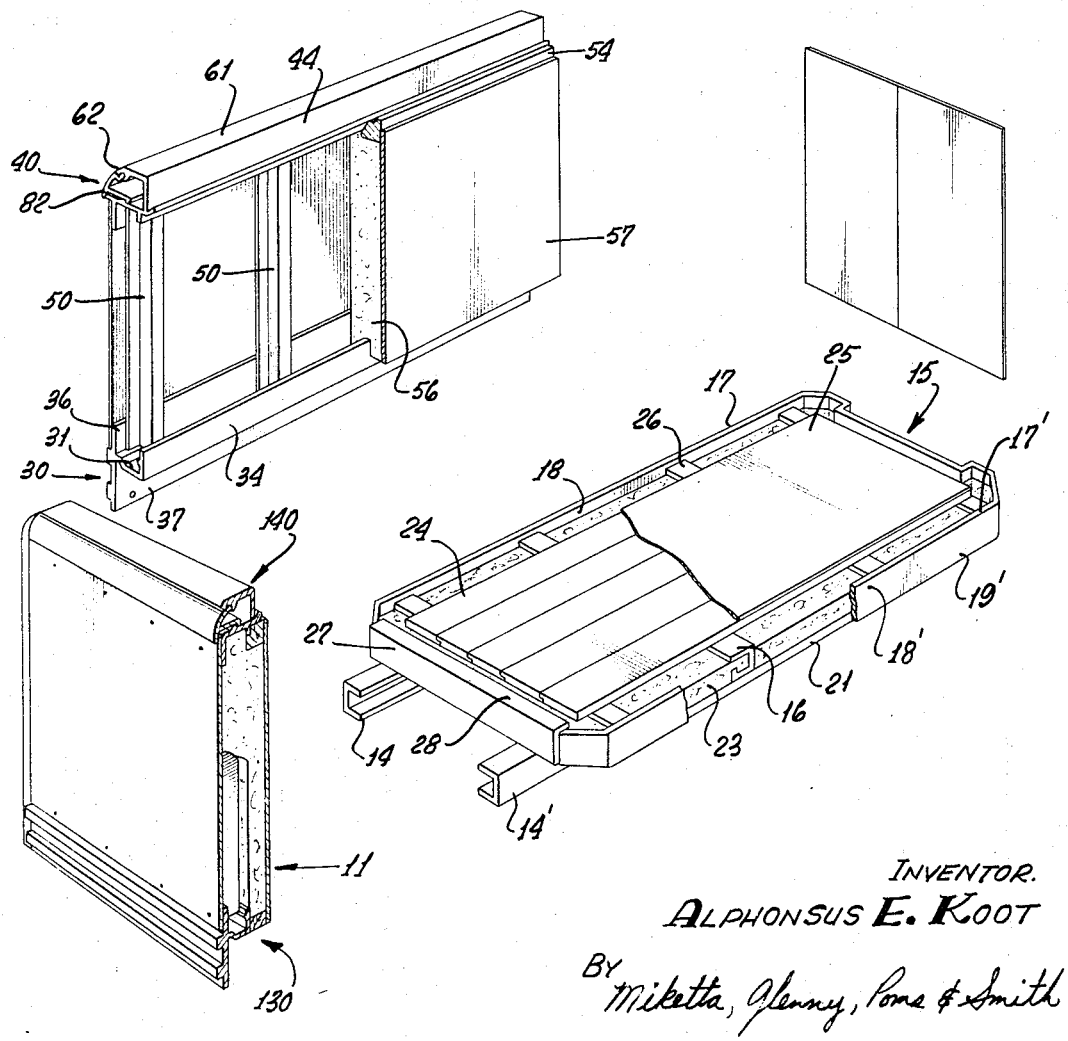
INVENTOR.
ALPHONSUS E. KOOT
BY Miketta, Glenny, Poms & Smith
ATTORNEYS.

United States Patent Office 3,353,863
Patented Nov. 21, 1967

3,353,863
VEHICLE BODY PANEL CONSTRUCTION
Alphonsus E. Koot, Brea, Calif., assignor to Aluminum Body Corporation, Montebello, Calif., a corporation of California
Filed Sept. 29, 1965, Ser. No. 491,199
17 Claims. (Cl. 296—28)

ABSTRACT OF THE DISCLOSURE

A prefabricated knock down vehicle body construction including roof, side and floor panels and panel joints. Side flanges or plate-like members are provided along the edges or side of a vehicle body frame with their marginal or edge areas thereof extending above and below the floor panel cross frame members. The floor panel may also be provided with a floor covering, a bottom pan and insulation therebetween. A bottom longeron of a side panel including a footing portion to seat upon the floor panel cross frame members adjacent the floor covering, a depending longeron flange means to extend down outside of the floor panel side flange and a downwardly opening recess or channel means in the longeron between the footing portion and depending longeron flange for receiving upwardly therein the upper marginal or edge areas of the flange or plate-like member mounted to the floor panel cross members. A top longeron for the side panel including a vertical longeron wall, a channel seat adjacent a lower portion of such vertical longeron wall and a bearing seat portion spaced from and inclined to such longeron wall. A rail member for a roof panel having a vertical rail wall to lie against said top longeron wall, a bottom footing to seat in said top longeron channel seat and a bearing flange spaced outwardly of and inclined to said rail member wall to seat on said top longeron bearing seat portion. Lower marginal areas of said floor panel said flanges extending below the floor panel cross frame members and bolted to lower portions of the side panel bottom longeron depending flange below the level of the body cross frame members. A bottom pan underlying the floor panel cross frame members and insulation material between said pan and floor panel floor covering, said pan being bolted to the floor panel side flanges and side panel lower or bottom longeron depending flanges below the level of the insulation and frame cross members.

*Background of the invention*

This invention relates in general to prefabricated panel vehicle body constructions and more particularly to panel joint constructions for such vehicle bodies to facilitate the assembly and fastening of roof, side and floor panels together to provide a completed vehicle body with a minimum expenditure of time and labor.

Prefabricated, knock down vehicle bodies made from aluminum, wood and/or plastic panels have been employed in the past to allow manufacture of a vehicle body in one location and assembly of the parts thereof into a completed body at a distant location. Such prefabricated components or parts are generally referred to as vehicle body kits which may be purchased by assemblers in kit form, kept in stock and assembled as needed for purchasers. However, in all such prior prefabricated vehicle body constructions or kits, the panels have not been truly complete finished unitary panels with insulation therein and with completely finished interior and floor surfaces. The erection of such prior prefabricated vehicle body kits has required additional means to hold the frame members in pre-assembled relationship while a plurality of laborers fastened the members together. The fastening of such panels and frame members together has required the passage of bolts and other conventional fastening means through the panels, necessitating access to the interior of the panels by the workman. Consequently, the interior of the panels could not be finished at the factory where made, but had to be shipped as less than complete finished panels for erection at the location of use.

None of these prior panel constructions were supplied to the assembler as a complete wall, roof or floor panel with inner insulation and a finished inner and outer surface which could be easily positioned upon the vehicle and assembled by exterior fastening means.

Another problem with the prior prefabricated vehicle bodies has been that the kit form has not had a universal adaptability to different wall thicknesses or interior finishes which might be desired by the user. The prefabricated vehicle body panel and panel joint construction of the present invention, allows the provision of completed roof, side and floor panels which need be merely assembled together and fastened by exterior means to provide a completed vehicle body. The thickness of the walls may be easily varied at the manufacturing site to a customer's desire without the need for changing the basic design and construction of the panels or panel joints. The completed panel can therefore be supplied to the assembler in the field without the need for further additions of insulation or panel wall spacer blocks or fillers.

Another problem which has occurred with prefabricated vehicle body constructions has arisen with the panel joints between the various roof, side and floor panels. A vehicle body is normally subjected to multidirectional twisting forces, or so-called racking forces during its use, particularly in high speed traveling over rough roads. Failure of conventional fastening means between the panels at the panel joints has occurred due to these racking forces. In addition, undesirable swaying or shifting of the vehicle body may occur, which can disturb the stability of the vehicle, if the body does not have strong rigid joints between the prefabricated panels.

It is therefore the principal object of the present invention to disclose and provide a prefabricated panel construction for use in prefabricated vehicle bodies which is readily assembled to a vehicle chassis and which does not require additional holding means for holding or positioning the panels relative to one another prior to the fastening of the panels together by exteriorly manipulated fastening means.

It is another object of the present invention to disclose and provide novel panel joint constructions which provide strong secure panel joints between panels of a prefabricated panel vehicle body which are resistant to racking forces and relieve the panel joint fastening means from shear stresses due to racking forces.

It is also an object of the present invention to disclose and provide a prefabricated vehicle body construction which allows a reduction in the amount of labor and time required to assemble completed roof, side and floor panels together upon a vehicle chassis prior to fastening the panels together and allows the use of fastening means along horizontal planes at a comfortable working position exteriorly of the vehicle body to save time and simplify the assembly technique.

It is still another object of the present invention to disclose a prefabricated vehicle body construction wherein all the component parts, in their sub-assembly stage, are completed final units which can be assembled on a vehicle chassis without interference with the truck body lining, insulation for any other necessary fittings or attachments required in order to made a completed vehicle body.

It is yet another object to disclose and provide a prefabricated vehicle body construction as in the foregoing object which allows manfacture of panel units with variations, to customer requirements, as to dimensions, lining or insulation without the need for changing or modifying the basic structural panel frame members and particularly the panel joints between the vehicle body panels.

These and various other objects, as well as additional advantages, modifications, adaptations and uses of the present invention, will become apparent to those skilled in the art from the following detailed description of an exemplary form of the present invention.

Reference will be made to the appended sheets of drawings in which:

FIG. 1 is a perspective view of an exemplary prefabricated vehicle body construction according to the present invention;

FIG. 2 is a vertical section view of the vehicle body of FIG. 1 taken therein along the plane II—II;

FIG. 3 is a detail perspective view of a top longeron member of the vehicle body of FIGS. 1 and 2;

FIG. 4 is a detail perspective view of a bottom longeron member of the vehicle body of FIGS. 1 and 2; and FIG. 5 is an exploded perspective view of the prefabricated vehicle body construction of FIGS. 1 through 4.

Referring to FIG. 1, an exemplary embodiment of vehicle body construction, in accordance with the present invention, is illustrated. It is to be understood that the vehicle body can be assembled from kit form on a vehicle chassis including a conventional cab or upon a trailer chassis to be attached to a cab, as shown in FIG. 1. In accordance with the present invention, the vehicle body is comprised of individual perfabricated panels which can be easily shipped from the place of manufacture as completed individual panel units and assembled to the vehicle chassis at a distant location. The exemplary knock down prefabricated vehicle body, indicated generally at 10 in FIG. 1, includes a front panel 11, side panels 12 and roof panel 13. As more readily seen in FIG. 5, there is also a body floor panel, indicated generally at 15 which may be mounted as a unit to the vehicle chassis or frame 14, 14'.

Referring to FIG. 5, the vehicle body floor panel, indicated generally at 15, comprises a plurality of floor panel cross frame members 16, which may be made from steel channels and spaced side plates or flanges 17, 17'.

Side plates or flanges 17, 17' may be welded along the outer edges of the cross frame members 16 to mount them in longitudinally extending relation to the vehicle body floor. These upstanding plates or flanges are provided with upper marginal areas or edge portions 18, 18' which extend above the upper surfaces of the floor panel cross frame members 16. Lower marginal areas or lower depending edge portions 19, 19' extend below the lower surfaces of the cross frame members 16. The upper marginal area or edge portions 18 form upstanding wall means on the vehicle body panel.

The vehicle body floor panel, including the cross frame members 16 and side plates or flanges 17, 17' may be positioned on and secured to the vehicle chassis or frame members 14, 14'. Where floor panel insulation is desired, a bottom pan 20 may be provided underlying the cross frame members 16 with outer downwardly turned edges 21. The bottom pan and its edges 21 may be secured to the frame members 16 and lower marginal areas 19, 19' of the plates or flanges 17, 17' by conventional fasteners, such as stainless steel screws or rivet means, 22. Insulation 23 may be filled in between the cross frame members 16, bottom or floor panel side flanges 17 and the bottom pan 20. Floor boards 24 may then be placed over the cross frame members 16 and be in turn covered with a floor covering of wood, steel or other suitable floor material.

The bottom panel side flanges 17, 17', in accordance with the present invention, are constructed and employed in a novel manner to allow the easy assembly and positioning of the vehicle side panels to the floor panel. To allow such assembly of the side panel to the floor panel or frame, outer edge portions 26, 26' are provided between the edges of the flooring 24, and the panel side flanges 17, 17'. These spaces or edge portions, 26, 26' on the cross frame members 16 provide a footing area on the floor panel frame to receive footing portions of the vehicle side wall panels. A flange 27 may be provided on the front or leading edge of the floor panel to receive a front panel 11 with a footing space or portion 28 provided between the forward edge of the floor boards and the upstanding flange 27.

The vehicle body side panel, as seen in FIGS. 2 and 5, includes a bottom longeron, indicated generally at 30, an upper longeron, indicated generally at 40, and a plurality of generally vertical frame members 50 interconnecting the longeron members. The longeron and vertical frame members may be made of extruded aluminum, the members 50 having a generally Z cross section, as best seen in FIG. 5.

The bottom longeron of the vehicle side panel, indicated generally at 30, is best seen in FIG. 4. A horizontal channel portion, indicated generally at 31, is provided to receive the bottom ends of the vertical frame members 50. An inner seat or ledge 32 is preferably provided to seat one edge or leg of the generally Z-shaped frame member and an outer seat or ledge 33 is preferably provided on an upstanding side wall 34 of the channel portion 31 to receive the other leg of the vertical frame members 50. The frame members and longeron members may be fastened together by conventional means.

The web of channel 31, in the exemplary embodiment, serves also as a footing for the side panel when mounted to a bottom panel. As seen in FIG. 2, the web or footing portion 31 of this lower longeron 30 is adapted to seat upon the bottom panel cross frame members 16 at the space or edge portions 26, 26' of the floor panel frame members 16, 16'. An upwardly extending outer flange 36 may also be provided upon the bottom longeron 30 to lie outside of the vertical frame members 50 and to allow bolting or riveting of the vertical frame members 50 to the bottom longeron 30 when received in the horizontal channel.

A depending flange 37 is also provided on the bottom or lower longeron, indicated generally at 30, to lie alongside and abut against the bottom panel side plates or flanges 17, 17'. The depending flange 37 preferably extends down below the lower level of the cross frame members 16 of the bottom panel. As seen in FIG. 2, after assembly of the side panel on the floor panel, the lower areas of the depending flange 37 and the lower marginal areas 19 of the bottom panel side flanges 17 may be bolted together. The bolt means 81 are positioned exteriorly of both the bottom panel and the side panels. Thus, bolting of the flanges 37 and 17 may be accomplished even though the panels are provided in kit form as completed units with insulation contained therein.

Conventional rub rails may be formed integrally of the bottom longeron as shown at 38 and 39.

The upper longeron of the vehicle body side panel, in accordance with the present invention and indicated generally at 40, is best seen in FIG. 3. The upper longeron preferably includes a web portion 41, an outer depending flange 42 and an inner depending flange 43, which together form a downwardly facing or opening channel to receive the upper ends of the vertical side panel frame members 50. An upper longeron wall 44 together with a longeron top flange 45 and the web 41 provide an electrical conduit receiving channel therebetween to allow storage of the various electrical wiring required on the vehicle body for the vehicle operating or running lights. A bolt head groove or recess 46 is preferably provided in the top flange 45 to receive the heads of bolts or fasteners 68 employed to hold a roof skin 67 to the roof rail member 66.

The upper and lower longerons may be assembled to the vertical frame members 50 to form a side panel frame by conventional fastening means, indicated generally at 51. An outer facing skin 52, such as aluminum sheet metal, may also be attached over the side panel frame by such fastening means, indicated generally at 51. Where an insulated side wall panel is desired, insulation 53 may be filled in between the vertical frame members and the outer skin 52.

Because of the novel construction of the present vehicle body, the side panels may be made in any thickness and still be easily assembled at the location of use without any fastening means extending through a side wall or interfering with the insulation provided. As seen in FIG. 2, an upper runner block or spacer block 44 and a lower runner or spacer block 54 may be provided by conventional means upon the upper and lower longeron members of the panel to enlarge the wall thickness. Additional insulation 56 of any conventional form may then be employed together with an inner facing sheet 57. The runner or spacer blocks 54, may be fastened to the longeron members by driving nails or spikes therethrough into the longeron members with the facing sheet 57 tacked, nailed or otherwise conventionally fastened to the runner blocks.

The top panel, indicated generally at 13, is best seen in FIGS. 2 and 5. The top panel comprises a plurality of roof rail members 60 which together form a rectangular frame. As seen in FIG. 2, each roof rail 60 includes a top flange 61 which overlies a top flange 45 of a corresponding top longeron, indicated generally at 40. The top flange 61 extends laterally of a roof rail wall 63. An inwardly directed lateral flange 64 is also provided on each roof rail wall 63 to underlie the plurality of roof cross frame members 65 which may be provided for increased frame rigidity.

A roof panel skin 67 is provided over the panel frame of roof rails 60, and preferably cross frame members 65, and is attached thereto by the fasteners 68. Where it is desired to have an insulated roof panel, insulation 69 may be provided between the cross frame members 65, rail members 60 and outer skin 67. If a thicker wall construction is desired, spacer blocks 70 may be provided on the inwardly extending flanges 64 of each roof rail 60 to accommodate additional insulation 71. An inner facing skin 72 may be attached also to the spacer block 70 by conventional means.

The front panel, indicated generally at 11, may be made similarly to the side panel in that the bottom longeron, indicated generally at 130, and top longeron, indicated generally at 140, may be made identically to the aforedescribed side panel bottom and top longerons respectively. Similar vertical frame members may be employed together with similar insulation and spacer blocks and facing sheets as desired. The front flange 27 may be made like the side flanges 17 or as shown in FIG. 5. A pair of conventional rear opening doors may also be provided by assembly in conventional manner to the raised and assembled side panels.

A vertical corner joint between a side panel, indicated generally at 12, and a front panel, indicated generally at 11, may be made by employing the roof rail 60 of the top panel along the outer vertical edges of the side panel and a top longeron of a side panel along the vertical outer edges of the front panel. A cross-sectional view taken horizontally through a vertical joint between a side panel and a front panel would therefore be identical to a vertical sectional view taken through the joint between a top panel and a side panel, as seen in the upper portion of FIG. 2. It is believed apparent to those skilled in the art how the joint described between the top and side panels is thus effected between the side panel and the front panel along the vertical corners thereof and it is not deemed necessary to show such construction in detail herein.

The rear portions of the vehicle body may be provided with a rear panel constructed in accordance with the front panel generally described hereinabove with conventional doors therein. Alternatively, the side panels can be provided with finished corners at their rear edges leaving an opening at the rear of the body to receive a conventional chain gate or other type of closure conventionally employed in the trade for closing the rear end of the vehicle body.

As particularly contemplated by the present invention, the assembly of the side panel, indicated generally at 12, to the vehicle body floor panel or frame, comprising the cross frame members 16 and side flanges 17 is initially accomplished without additional fastening means or positioning means. That is, the panel construction of the present invention allows the placing of a finished side panel upon the vehicle floor panel or frame, which because of its novel construction, retains itself in assembled relationship.

As seen in FIG. 2, the side panel, indicated generally at 12, because of the bottom longeron construction indicated generally at 30, may be placed upon the vehicle floor panel cross frame members with the side panel footing or channel web 35 resting upon the outer edges or footing portions 26 of the cross members 16. The depending flange 37 of the bottom longeron, indicated generally at 30, extends downwardly along and abuts against the side of the floor panel flange 17.

In order to hold the side panel in such assembled relationship to the floor panel during assembly operations without additional holding means, panel positioning and holding means are provided in the bottom longeron whereby the side panel holds itself in such assembled relationship. Such side panel positioning and holding means in the exemplary embodiment, comprises a downwardly opening flange receiving channel means 80 preferably provided between the depending flange 37 and footing means 35 of the bottom longeron, indicated generally at 30. The upper marginal areas or upstanding walls 18, 18' of the floor panel frame side flanges 17 are received in the channel means 80 when the side panel is placed upon the floor panel.

The panel joint provided by the reception of the upper portions of a flange or plate 17 within the flange receiving channel means 80 between the panel footing 35 and depending flange 37 is of exceptionally strong nature and allows positioning and holding of the panel in assembled relationship within additional fastening means. Thereafter, after assembly of all panels to the vehicle frame, the mechanic or assembler may fasten the side panel flange 37 to the floor panel flange 17 below the level of the cross frame members 16 by bolt means 81. The fastening of flanges 37 and 17 is thus accomplished at a convenient height exteriorly of the panels after they are held in an assembled relationship by the aforementioned novel panel joint construction.

After a side panel unit has been assembled and positioned upon the floor panel, which may be merely the frame members 16 and side flanges 17 or a complete insulated panel as shown in FIGS. 2 and 5, the roof panel, indicated generally at 13, may be assembled thereto. Again, the assembly of the roof panel to the raised side and front panels may be accomplished prior to fastening of any of the panels to one another or to the floor panel frame because of the novel panel joint construction disclosed herein.

As seen in FIG. 2, each side panel upper longeron, indicated generally at 40, is provided with a longitudinally extending channel seat means 48 extending along the lower inner portion of the longeron wall 44. The lower end of the roof rail wall 63 extends below the inwardly extending lateral flange 64 to provide a longitudinally extending narrow depending wall or foot portion 66. This foot portion 66 of the top panel or roof rail member is received in the channel seat 48 of the corresponding side panel top longeron member, indicated generally at 40.

When the top or roof panel, indicated generally at 13, is assembled to the front and side panels, the foot portions 66 hold the roof panel in assembled relation to the front and side panels. The roof, front and side panels may then be bolted together by conventional bolt means extending through the roof rail top flange 61 and the top longeron top flange 45. The conduit receiving channel formed by the longeron flange 45, wall 44 and web 41 provides access to the underside of flange 45 and any bolts passed through the roof rail flange 61 and top longeron flange 45. This fastening of the roof rail members to the side panel top longeron members, accomplished exteriorly of the vehicle body panels, is not affected by the panel thickness or insulation, and allows a complete finished panel to be assembled quickly and easily providing a finished vehicle construction.

In order to relieve the bolts holding roof rail flange 61 to the top longeron flange 45 from shear forces and to improve the racking resistance of the roof-side panel joint, additional means are provided on the roof rail members to bear against and absorb shear forces occurring between the roof and top longeron flanges. Such means include a bearing seat flange 47 on the side panel top longeron having a generally flat surface inclined to the longeron wall 44. A roof rail bearing flange 62 is also provided on the roof rail extending from an inclined to the roof rail top flange 61 to overlie and bear upon the top longeron bearing seat 47.

When the roof panel is assembled to the side and front panels, the roof rail footing portion 66 of each roof rail 60 is received in a channel seat 48 with a first vertical bearing surface between the roof rail wall 63 and the side panel top longeron wall 44. The provision of bearing flange 62 and bearing seat 47 as aforedescribed provides a second bearing surface between the roof rail member and top longeron member which is at an angle or is inclined to the vertical bearing surface between walls 44 and 63. The included angles between the flange 62 and wall 63 on the rail member and the bearing seat 47 and wall 44 on the longeron member are each preferably less than 45° so that these additional bearing surfaces can absorb horizontal loading or racking forces.

After the assembly of the front, side and top panels, and as previously stated, fastening means may be applied externally of the panels through the flanges 37 and 17 below the level of the floor panel, as by bolts 81, and through the flanges 45 and 61 of the top longeron in roof rail members, through the channel or recessed formed in the top longeron member. A resilient cap 82 may be provided to enclose the recess provided in the top longeron member and any wiring or conduits which may be positioned in such recess. These fastening means, however, are not necessary to maintain the vehicle body panels in prefinished assembled relation. The present prefabricated vehicle body construction, therefore, greatly reduces the amount of time and labor necessary to assemble and position the panels together, allows the fastening of such panels together by a single workman working exteriorly of the vehicle body and provides a very strong vehicle body construction having high resistance to bending or shifting of panels relative to each other because of racking forces exerted thereon.

While only a single preferred exemplary embodiment of a vehicle body panel construction, according to the invention, has been disclosed and described in detail herein, it should be understood that other modifications, adaptations and embodiments may be made within the scope of the present invention, which is defined by the following claims.

I claim:

1. A prefabricated knock down vehicle body construction comprising:
a roof panel having a frame including a plurality of roof rail members and interconnecting cross frame members and an outer facing skin overlying said frame, each said roof rail member including a rail member wall having a bottom footing edge and a bearing flange spaced outwardly of and inclined to said rail member wall;
side panels each having a frame including top and bottom longerons, side rail members and an outer side wall facing skin;
said top longeron including a longeron wall, a channel seat adjacent a lower portion of said longeron wall to receive a roof rail wall bottom footing edge and a bearing seat portion spaced from and inclined to said longeron wall to receive said roof rail bearing flange; and
a floor panel having a frame, including a pair of spaced opposed side flanges and a plurality of interconnecting floor panel cross frame members, and a floor covering over a portion of said panel cross frame members,
said side flanges having upper marginal areas extending above said floor panel cross frame members;
said side panel bottom longeron including a footing portion to seat upon said floor panel cross frame members adjacent said floor covering and side flanges, depending longeron flange means to extend down along side said floor panel side flanges and a downwardly opening flange receiving channel means between said footing portion and said depending longeron flange portion for receiving an upper marginal area of a floor panel side flange,
whereby said roof, side and floor panels may be readily placed in complete assembled relationship prior to fastening said panels together.

2. The vehicle body construction of claim 1 wherein:
said floor panel includes a bottom pan underlying said floor panel cross frame members and abutting said floor panel side flanges and insulation material inside said panel between said floor covering and bottom pan; and
said floor panel side flanges include lower marginal areas extending below said floor panel cross frame members to abut lower portions of said side panel bottom longeron depending longeron flange to allow bolting of said longeron flange to said floor panel flange below the level of said floor panel cross frame members.

3. The vehicle body construction of claim 1 wherein:
said roof panel includes an inner facing skin underlying said frame with insulation material in said panel between said facing skins; and
said side panels each include inner side wall facing skin with insulation material in said panel between the side wall facing skins.

4. A prefabricated vehicle body panel joint for joining a side wall panel to a vehicle body comprising:
an upstanding longitudinally extending plate member;
means for mounting said plate member to frame members of said vehicle body along a side of a vehicle body floor provided over said frame members;
said plate member having upper marginal areas thereof extending above said frame members; and
a longeron member to be mounted along the bottom of a side wall panel including a recess means therein to receive upper portions of said plate member therein and a footing portion to seat upon said frame members adjacent said plate member to thereby position and hold said side panel in an upstanding assembled relation to said vehicle body.

5. The panel joint of claim 4 wherein:
said longeron member also includes a depending flange portion to lie along and abut against a side of said plate member, each of said plate member and longeron member depending flanges extending below the level of said vehicle body frame members, and bolt means are provided below the level of said frame members for bolting said flanges together.

6. A prefabricated vehicle body panel joint comprising:
a longeron mounted along the top of a vehicle body side wall panel including a vertical longeron wall, a channel seat along a lower portion of said wall and a bearing seat spaced from and inclined to said longeron wall; and a roof rail member mounted along a side of a roof panel including a vertical rail member wall having a lower footing portion to be received in said channel seat with said rail member wall lying against said longeron wall and a bearing flange spaced from and inclined to said rail member wall to bear against said longeron bearing seat when said footing portion is received in said channel seat.

7. The panel joint of claim 6 wherein said bearing seat and bearing flange lie generally in planes making included angles of less than forty-five degrees with the planes of said longeron wall and rail member wall respectively.

8. A prefabricated vehicle panel construction comprising:

a top longeron, side rail member and a bottom longeron interconnected to form a panel frame and a panel facing skin overlying said frame, and an upstanding wall mounted to the side of a vehicle body floor supporting frame member, wherein said bottom longeron includes a footing portion to seat on said vehicle frame member, a depending flange to fit against an outer side of said wall and an upwardly extending inner recess means between said footing portion and said flange to receive said upstanding wall on said vehicle frame member, said upstanding wall extending upwardly into said recess above the level of said vehicle frame member.

9. A prefabricated unitary vehicle body panel construction for use with a vehicle body frame having an upstanding wall portion along an edge thereof, said panel construction comprising:

top, bottom and side frame members joined together to form a panel frame wherein said bottom frame member includes a footing portion to seat upon a vehicle body frame member, a vertically depending flange to lie along an outer edge of the vehicle body frame and vertical side walled recess means between said footing portion and said depending flange for receiving said upstanding wall portion therein above said vehicle body frame to mount said panel frame to said vehicle body frame.

10. A vehicle body construction comprising:

a pair of spaced opposed upstanding wall means mounted at outer edges of a vehicle body frame, each said wall means including upper marginal areas extending above adjacent portions of the vehicle body frame;

a pair of side panels mounted on said vehicle body frame, each of said side panels having a bottom longeron means for mounting the panel to the vehicle body frame and to one of said wall means;

each said bottom longeron including a footing portion to rest upon said vehicle body frame and recess means adjacent said footing portion for receiving and assembling said panel to said vehicle body frame by one of said wall means, each of said recess means receiving the associated wall means upper marginal areas therein above the level where the associated footing portion rests upon said vehicle body frame.

11. A vehicle body construction comprising:

a floor frame including a pair of spaced opposed side flanges and a plurality of cross frame members joining said flanges, said flanges having upper vertical marginal edge portions extending above said cross frame members; and a pair of side panels, each including a bottom longeron and a top longeron, each said bottom longeron including longitudinally extending recess means for receiving and mounting said associated side panel on a side flange of said floor frame to hold said panel in assembled relation to said floor frame, said recess means receiving the associated side flange upper vertical marginal edge portions upwardly therebetween above the level of said cross frame members.

12. The vehicle body construction of claim 11 wherein:

each said side panel top longeron includes a recessed seat means and an inclined bearing seat flange spaced from said recessed seat means; and said body construction includes a top panel having roof rail members providing a roof panel frame to be assembled into said side panel top longeron, each said roof rail member including a footing flange to seat in said longeron recessed seat means and a spaced inclined bearing flange to seat upon said longeron inclined bearing seat flange.

13. The vehicle body construction of claim 11 wherein:

each of said side panels include insulation material therein;

said floor frame is provided with a bottom pan and a top floor covering with insulation material therebetween;

each of said bottom longeron and floor frame side flanges is provided with a depending flange portion extending below the level of said cross frame members; and bolt means are provided extending through adjacent depending flange portions below the level of said cross frame members for fastening said associated longeron and frame side flanges together.

14. The vehicle body construction of claim 11 wherein:

said marginal edge portions are received in said recess means in lateral engagement with said recess means vertical side walls.

15. The vehicle body construction of claim 11 wherein:

said bottom longeron includes a horizontal footing portion engaging said plurality of cross frame members between and in a plane generally perpendicular to the planes of said side flanges.

16. The vehicle body construction of claim 15 wherein:

each of said bottom longerons includes a depending outer wall extending down below the level of said cross frame members;

each of said floor frame side flanges has a lower portion extending down below said frame members; and said bottom longeron depending outer walls and the associated floor frame side flange lower portions are fastened together below the level of said cross frame members.

17. A prefabricated knock down vehicle body construction comprising:

a unitary floor panel including a pair of spaced opposed side flanges joined by a plurality of cross frame members, said side flanges having upper marginal areas extending above said cross frame members and lower marginal areas extending below said cross frame members;

a floor means overlying central portions of said cross frame members and spaced inwardly of said side flanges to provide spaces on edge portions of said cross frame members to receive footing portions of side wall panels;

a unitary side panel including a bottom longeron, a top longeron and a plurality of interconnecting side frame members;

said bottom longeron including a footing portion to seat upon edge portions of said floor panel cross frame members, depending flange means to extend down along side and against said floor panel side flanges and a downwardly opening flange receiving channel means between said depending flange and said footing portion for receiving said upper marginal areas of said side flanges therein to position and hold said side panel assembled to said floor panel;

said top longeron including a generally vertical wall portion, a channel seat extending along a lower inner edge of said wall and an inclined bearing seat flange spaced upwardly of said channel seat and outwardly of said wall;

a unitary top panel including roof rail means interconnected by a plurality of roof cross frame members, said roof rail means including a generally vertical narrow depending footing flange to seat in said channel seat of said side panel top longeron, a roof rail vertical wall portion to abut said top longeron vertical wall, and a downwardly inclined bearing flange extending from said roof rail vertical wall to seat upon said top longeron inclined bearing seat flange.

References Cited
UNITED STATES PATENTS

| | | | |
|---|---|---|---|
| 1,085,645 | 2/1914 | Tollerton. | |
| 2,177,699 | 10/1939 | Fisher | 52—262 |
| 2,183,381 | 12/1939 | McLaughlin | 52—282 |
| 2,600,140 | 6/1952 | Toreth | 296—28 |
| 3,034,824 | 5/1962 | Schubach | 296—28 |
| 3,097,877 | 7/1963 | Erlandsen | 296—28 |
| 3,266,837 | 8/1966 | Stricker et al. | 296—36 |

LEO FRIAGLIA, *Primary Examiner.*

BENJAMIN HERSH, *Examiner.*

J. A. PEKAR, *Assistant Examiner.*